US012783879B2

(12) United States Patent
Jhawar et al.

(10) Patent No.: US 12,783,879 B2
(45) Date of Patent: Nov. 3, 2026

(54) METHOD AND ELECTRONIC DEVICE FOR SECURE TRAINING OF AN ARTIFICIAL INTELLIGENCE (AI) MODEL

(71) Applicant: Samsung Electronics Co., Ltd., Suwon-si (KR)

(72) Inventors: Aditya Jhawar, Bengaluru (IN); Rajesh Kumar Panda, Bengaluru (IN); Nikhil Sahni, Bengaluru (IN); Aarif Zafar, Bengaluru (IN); Renju Chirakarotu Nair, Bengaluru (IN); Shubham Jain, Bengaluru (IN); Umesh Murlidhar Patil, Bengaluru (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 827 days.

(21) Appl. No.: 18/303,976

(22) Filed: Apr. 20, 2023

(65) Prior Publication Data

US 2023/0342603 A1 Oct. 26, 2023

(30) Foreign Application Priority Data

Apr. 25, 2022 (IN) ............................ 202241024103
Oct. 17, 2022 (IN) ............................ 2022 41024103

(51) Int. Cl.
*G06N 3/08* (2023.01)

(52) U.S. Cl.
CPC ..................................... *G06N 3/08* (2013.01)

(58) Field of Classification Search
None
See application file for complete search history.

(56) References Cited

U.S. PATENT DOCUMENTS 10,839,069 B2 * 11/2020 Shen .................. G06F 9/45558
12,499,264 B2 * 12/2025 Cheng .................. G06F 16/242
2018/0375638 A1 * 12/2018 Khanna .................. G06N 20/00
2019/0042937 A1 * 2/2019 Sheller .................. G06F 21/554

(Continued)

FOREIGN PATENT DOCUMENTS

CN 113128544 A 7/2021
CN 113487042 A 10/2021
CN 113591040 A 11/2021

OTHER PUBLICATIONS

Niu et al., AsymML: An Asymmetric Decomposition Framework for Privacy-Preserving DNN Training and Inference [Submitted on Oct. 4, 2021].

(Continued)

*Primary Examiner* — Haimei Jiang
(74) *Attorney, Agent, or Firm* — Jefferson IP Law, LLP

(57) ABSTRACT

A method and an electronic device for secure training of an artificial intelligence (AI) model are provided. The method includes determining, by the electronic device, a first set of layers from a base AI model for performing training in a secure mode, and determining, by the electronic device, a second set of layers other than the first set of layers in the base AI model, simultaneously training, by the electronic device, the first set of layers in the secure mode and the second set of layers in a non-secure mode, and generating, by the electronic device, the AI model by combining the trained first set of layers and the trained second set of layers in the secure mode.

18 Claims, 11 Drawing Sheets

(56) References Cited

U.S. PATENT DOCUMENTS

| | | | | |
|---|---|---|---|---|
| 2019/0050570 | A1* | 2/2019 | Kannan | G06F 21/79 |
| 2020/0220713 | A1* | 7/2020 | Li | H04L 9/14 |
| 2020/0272899 | A1* | 8/2020 | Dunne | G06N 3/045 |
| 2021/0216865 | A1* | 7/2021 | Versace | G06F 18/214 |
| 2022/0067570 | A1* | 3/2022 | Kong | G06F 18/214 |
| 2022/0114836 | A1* | 4/2022 | Kim | G06N 3/08 |
| 2022/0405430 | A1* | 12/2022 | Huh | G06F 18/251 |
| 2022/0414223 | A1* | 12/2022 | Liu | G06F 21/606 |
| 2023/0117247 | A1* | 4/2023 | Xiao | G06N 3/082 706/15 |
| 2023/0168911 | A1* | 6/2023 | Lopez Pascual | G06F 9/45558 718/1 |
| 2023/0252311 | A1* | 8/2023 | Nussinovitch | G06N 5/022 706/12 |
| 2023/0281069 | A1* | 9/2023 | Goska | G06F 11/0721 714/37 |
| 2023/0297696 | A1* | 9/2023 | Rogers | G06F 9/45558 713/189 |
| 2023/0342603 | A1* | 10/2023 | Jhawar | G06N 3/08 |
| 2025/0238269 | A1* | 7/2025 | Cheng | G06F 12/1491 |

OTHER PUBLICATIONS

Indian Office Action dated Apr. 1, 2025, issued in an Indian Patent Application No. 202241024103.

* cited by examiner

METHOD AND ELECTRONIC DEVICE FOR SECURE TRAINING OF AN ARTIFICIAL INTELLIGENCE (AI) MODEL

CROSS-REFERENCE TO RELATED APPLICATION(S)

This application is based on and claims priority under 35 U.S.C. § 119(a) of an Indian provisional patent application number 202241024103, filed on Apr. 25, 2022, in the Indian Patent Office, and of an Indian Complete patent application number 202241024103, filed on Oct. 17, 2022, in the Indian Patent Office, the disclosure of each of which is incorporated by reference herein in its entirety.

BACKGROUND

1. Field

The disclosure relates to electronic devices. More particularly, the disclosure relates to a method and an electronic device for secure training of an artificial intelligence (AI) model.

2. Description of Related Art

In general, an artificial intelligence (AI) model is trained to recognize certain types of patterns, and perform a variety of tasks. However, performance of the AI model depends upon a quality and a size of dataset. Sometimes, datasets for a task are small. At such times, the AI model is trained for a general problem using a large dataset and the trained model is re-trained on the small task-specific dataset for specialization. On-device training of the AI model facilitates such use cases, where a user can train a base AI model with generalized data. Nowadays, users create the AI models using multiple frameworks. However, secure on-device training is not supported for most of the frameworks.

According to the related art, the training of the AI models on an electronic device, such as for example but not limited to a smart phone mostly rely on sending data to an external cloud server where a single model is trained and sent to the electronic device. This approach is infeasible and results in data privacy concerns. Hence, an alternative method exists for training the AI models on the electronic device over small datasets aggregated over a period of time on an external device instead of sending data to the external cloud servers. Although, there is no evident risk as in data privacy concerns, there arises AI security attacks e.g., membership inference attacks, where the user data can also be leaked from the AI models. According to the related art, TensorFlow provides an application programming interface (API) to train the AI models on the electronic devices, but this approach is limited to the TensorFlow and compatible formats of the TensorFlow. There is no reliable framework to easily convert other commonly used AI model formats to the TensorFlow. The Tensorflow only provides training APIs and does not protect the AI model against thefts or attacks. To provide security to the AI models during training, methods of the related art employ trustzones. However, the memory is constrained in methods of the related art.

Thus, it is desired to address the above mentioned disadvantages or other shortcomings or at least provide a useful alternative.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and an electronic device for secure training of an artificial intelligence (AI) model. The method includes determining a first set of layers from a base AI model for performing training in a secure mode and determining a second set of layers other than the first set of layers in the base AI model to be trained in a non-secure mode.

Another aspect of the disclosure is to perform training of a first set of layers in a secure mode and training of a second set of layers in a non-secure mode, simultaneously.

Another aspect of the disclosure is to generate the AI model by combining the trained first set of layers and the trained second set of layers in the secure mode.

Therefore, the proposed method provides a robust and customizable training platform or a framework to convert any of the commonly used AI formats, such as for example but not limited to TensorFlow Lite (tflite), Keras, PyTorch, CoreAI, Scikit, TensorFlow, or the like, to an electronic device supported training format, such as for example open neural network exchange (ONNX), and retrain the AI model on-device using an in-house secure trainer. The proposed method provides an on-device framework to support training and inference on the converted AI model securely. The trained AI model works with all kinds of data and is not restricted to image data. AI model security and protection against malicious operations are ensured, before, after and during the training of AI model, by encrypting the complete package and performing the training on a protected kernel virtual machine (PKVM). Thereby, achieving better memory management and resource management, and making the training process secure.

Additional aspects will be set forth in part in the description which follows and, in part, will be apparent from the description, or may be learned by practice of the presented embodiments.

In accordance with an aspect disclosure, a method for secure training of an AI model by an electronic device is provided. The method includes determining, by the electronic device, a first set of layers from a base AI model for performing training in a secure mode, determining a second set of layers other than the first set of layers in the base AI model, simultaneously training, by the electronic device, the first set of layers in the secure mode and the second set of layers in a non-secure mode, and generating, by the electronic device, the AI model by combining the trained first set of layers and the trained second set of layers in the secure mode.

In an embodiment of the disclosure, the first set of layers is determined from the base AI model by receiving the base AI model comprising a plurality of layers, determining an importance score for each layer of the plurality of layers based on an amount of data available in each layer of the plurality of layers, determining at least one layer of the plurality of layers having the importance score greater than an importance score threshold, and determining the first set of layers of the plurality of layers having the importance score greater than the importance score threshold.

In an embodiment of the disclosure, the first set of layers is trained in the secure mode, by selecting the first set of layers from the base AI model. The base AI model is encrypted using an encryption key after selecting the first set of layers from the base AI model. A training dataset is obtained from at least one application at a first portion of the electronic device. The training dataset is verified at the first portion of the electronic device, and the verified dataset and the encrypted base AI model with the first set of layers are sent to a second portion of the electronic device for training the first set of layers in the secure mode.

In an embodiment of the disclosure, the second set of layers are trained in the non-secure mode by selecting the second set of layers from the base AI model, and sending the base AI model with the second set of layers to the first portion of the electronic device for training the second set of layers in the non-secure mode.

In an embodiment of the disclosure, the first portion is a host operating system of the electronic device and the second portion is a protected kernel virtual machine (PKVM) of the electronic device.

In an embodiment of the disclosure, the training dataset at the first portion of the electronic device is verified by determining a hash value of the training dataset, generating a digital signature from the hash value of the training dataset using the encryption key, and verifying the training dataset based on the generated digital signature.

In an embodiment of the disclosure, the base AI model is trained by decrypting the encrypted base AI model using a decryption key at the second portion of the electronic device, and training the base AI model using the training dataset.

In an embodiment of the disclosure, simultaneously training, by the electronic device, the first set of layers in the secure mode and the second set of layers in the non-secure mode includes selecting at least one first type of training from a plurality of layer training types to train the first set of layers, selecting at least one second type of training from the plurality of layer training types to train the second set of layers, and simultaneously training the first set of layers in the secure mode using the at least one first type of training and the second set of layers in the non-secure mode using the at least one second type of training. The first type of training is different than the second type of training.

In an embodiment of the disclosure, simultaneously training, by the electronic device, the first set of layers in the secure mode and the second set of layers in the non-secure mode includes selecting one type of training from a plurality of layer training types to train the first set of layers and the second set of layers, and simultaneously training the first set of layers in the secure mode using the selected layer training type and the second set of layers in the non-secure mode using the same selected layer training type.

In an embodiment of the disclosure, the plurality of layer training types includes but not limited to a regular training type, a transfer learning training type, a continual learning training type, a few shot learning training type, a reinforcement learning training type and a shallow learning training type.

In an embodiment of the disclosure, the method further includes encrypting, by the electronic device, the AI model. The encrypted AI model is transmitted to at least one application of the electronic device, and one or more inference actions are performed in the at least one application using the at least one encrypted AI model.

In accordance with another aspect of the disclosure, an electronic device for secure training of an AI model is provided. The electronic device includes a memory, a processor coupled to the memory, a communicator coupled to the memory and the processor, and an AI model controller coupled to the memory, the processor and the communicator. The AI model controller is configured to determine a first set of layers from a base AI model for performing training in a secure mode, determine a second set of layers other than the first set of layers in the base AI model, simultaneously train the first set of layers in the secure mode and the second set of layers in a non-secure mode, and generate the AI model by combining the trained first set of layers and the trained second set of layers in the secure mode.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

and

Figure 9:
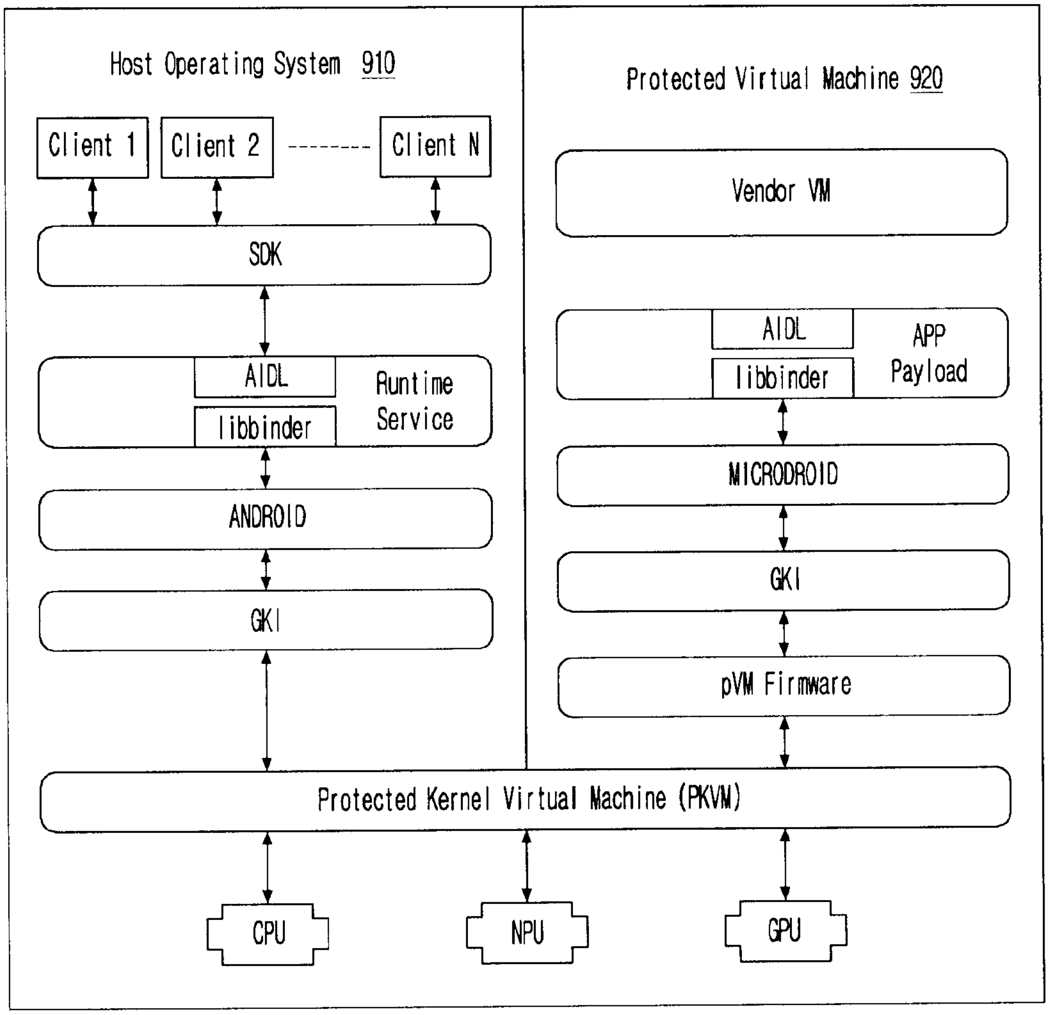

FIG. 9 is a block diagram illustrating a run-time execution of an AI model in a protected kernel virtual machine (PKVM) according to an embodiment of the disclosure.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As is traditional in the field, embodiments may be described and illustrated in terms of blocks which carry out a described function or functions. These blocks, which may be referred to herein as units or modules or the like, are physically implemented by analog or digital circuits, such as logic gates, integrated circuits, microprocessors, microcontrollers, memory circuits, passive electronic components, active electronic components, optical components, hardwired circuits and the like, and may optionally be driven by firmware. The circuits may, for example, be embodied in one or more semiconductor chips, or on substrate supports, such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the disclosure should be construed to extend to any alterations, equivalents and substitutes in addition to those which are particularly set out in the accompanying drawings. Although the terms first, second, or the like, may be used herein to describe various elements, these elements should not be limited by these terms. These terms are generally only used to distinguish one element from another.

Accordingly, the embodiments herein disclose a method for secure training of an artificial intelligence (AI) model by an electronic device. The method includes determining, by the electronic device, a first set of layers from a base AI model for performing training in a secure mode, and determining, by the electronic device, a second set of layers other than the first set of layers in the base AI model. The method also includes simultaneously training, by the electronic device, the first set of layers in the secure mode and the second set of layers in a non-secure mode. Further, the method includes generating, by the electronic device, the AI model by combining the trained first set of layers and the trained second set of layers in the secure mode.

Accordingly, the embodiments herein disclose an electronic device for secure training of an AI model. The electronic device includes a memory, a processor coupled to the memory, a communicator coupled to the memory and the processor, and an AI model controller coupled to the memory, the processor and the communicator. The AI model controller is configured to determine a first set of layers from a base AI model for performing training in a secure mode, determine a second set of layers other than the first set of layers in the base AI model, simultaneously train the first set of layers in the secure mode and the second set of layers in a non-secure mode, and generate the AI model by combining the trained first set of layers and the trained second set of layers in the secure mode.

Methods and system of the related art provide federated training of a neural network using trusted edge devices. The system of the related art uses a federated learning approach to train machine learning (ML) models on multiple edge devices such that training data never leaves the edge device. Each edge device trains own ML model and sends into an aggregator device. The aggregator devices assemble and combine the received training models to one model and send them back to the edge device. The edge devices perform computations on trust execution environments. However, the system of the related art does not provide a framework to convert any of the commonly used machine learning formats to electronic device supported training format, and does not provide degree of control to the business in selecting the layers to be retrained.

Methods and system of the related art provides a privacy-preserving training and inference framework that decomposes a deep neural network (DNN) model into two parts, trusted and untrusted. The parts are determined by exploiting the low-rank characteristics in the inputs and the intermediate features. The trusted part handles the privacy-sensitive computations, but incurs small computation and memory costs. The untrusted part is computationally-intensive but not privacy-sensitive. Here, the data is split into privacy sensitive and non-sensitive part, and the DNN model is trained on the privacy sensitive and non-sensitive part and combined. However, the system of the related art does not provide a framework to convert any of the commonly used machine learning formats to electronic device supported training format, and does not provide degree of control to the business in selecting the layers to be retrained. Further, the system of the related art uses the trust zone for performing secure computations instead of using PKVM.

Unlike to the methods and system of the related art, the proposed method determines a first set of layers from a base AI model for training the AI model in a secure mode, and a second set of layers other than the first set of layers in the base AI model in a non-secure mode, trains the first set of layers in the secure mode, and the second set of layers in the non-secure mode simultaneously, and generates a securely trained model by combining the trained first set of layers and the second set of layers in the secure mode.

The proposed method provides a framework to convert any of the commonly used machine learning formats to the electronic device supported training format, and retrain the AI model on-device using an in-house secure trainer. Single entity-training environment is provided as an abstraction and uses a protected kernel virtual machine (PKVM) as a secure computing unit at the backend. The PKVM adaptively builds its own training logic based on the training scenario, model and data, which are subsequently executed on the computing unit. The proposed method provides a customizable and robust training environment to handle an optimal training, such as for example time-accuracy-space control using a selective layer training, a catastrophic forgetting using an online continual learning paradigm, and small training datasets using few shot learning, instead of using a predefined training environment which might not be always feasible and optimal. The proposed method ensures security and protects the AI model from thefts before, after and during training of the AI model.

Referring now to the drawings and more particularly to FIGS. 1 through 9, where similar reference characters denote corresponding features consistently throughout the figure, these are shown preferred embodiments.

Figure 1:
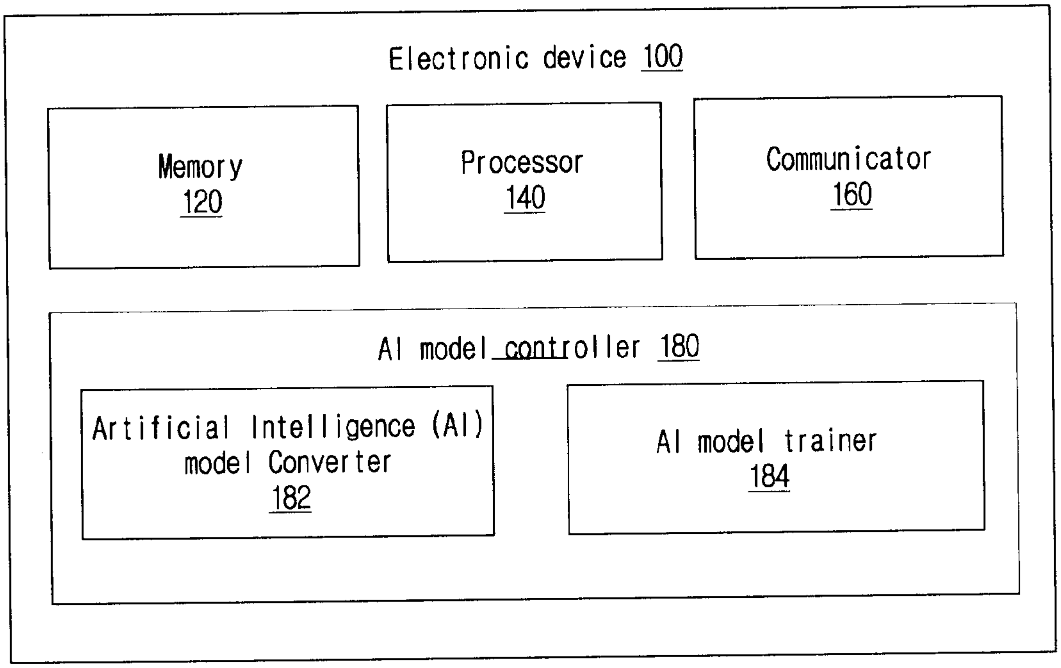
FIG. 1 is a block diagram of an electronic device for secure training of an artificial intelligence (AI) model according to an embodiment of the disclosure.

FIG. 1 is a block diagram of an electronic device for secure training of the AI model according to an embodiment of the disclosure.

Referring to FIG. 1, an electronic device 100 may be but not limited to a laptop, a palmtop, a desktop, a mobile phone, a smart phone, personal digital assistant (PDA), a tablet, a wearable device, an Internet of things (IoT) device, a virtual reality device, a foldable device, a flexible device, a display device and an immersive system.

In an embodiment of the disclosure, the electronic device 100 includes a memory 120, a processor 140, a communicator 160, and an AI model controller 180.

The memory 120 is configured to store encrypted model package with necessary information. The memory 120 is also configured to store digital signature and pre-processed dataset in base AI model. The memory 120 can include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 120 may, in some examples, be considered a non-transitory storage medium. The term "non-transitory" may indicate that the storage medium is not embodied in a carrier wave or a propagated signal. However, the term "non-transitory" should not be interpreted that the memory 120 is non-movable. In some examples, the memory 120 is configured to store larger amounts of information. In certain examples, a non-transitory storage medium may store data that can, over time, change (e.g., in a random access memory (RAM) or cache).

The processor 140 may include one or a plurality of processors. The one or the plurality of processors may be a general-purpose processor, such as a central processing unit (CPU), an application processor (AP), or the like, a graphics-only processing unit, such as a graphics processing unit (GPU), a visual processing unit (VPU), and/or an AI-dedicated processor, such as a neural processing unit (NPU). The processor 140 may include multiple cores and is configured to execute the instructions stored in the memory 120.

In an embodiment of the disclosure, the communicator 160 includes an electronic circuit specific to a standard that enables wired or wireless communication. The communicator 160 is configured to communicate internally between internal hardware components of the electronic device 100 and with external devices via one or more networks.

In an embodiment of the disclosure, the AI model controller 180 includes an AI model converter 182, and an AI model trainer 184.

In an embodiment of the disclosure, the AI model converter 182 of the AI model controller 180 is configured to receive the base AI model to be trained in any of the commonly used AI formats. The commonly used AI formats includes for example but are not limited to TensorFlow Lite (tflite), Keras, PyTorch, CoreAI, Scikit, TensorFlow, or the like. The AI model converter 182 is configured to convert the commonly used AI formats to a device-trainable format, such as for example open neural network exchange (ONNX). The AI model converter 182 is configured to encrypt the converted base AI model, and store the encrypted model in a package with necessary information.

In an embodiment of the disclosure, the AI model trainer 184 of the AI model controller 180 is configured to obtain a training dataset from at least one application operating in at least one portion of a host operating system of the electronic device 100, and pre-process the obtained training dataset on-device. The at least one application obtains the training dataset from the user and/or external system/device, or the at least one application itself generates the training dataset in the electronic device 100 without depending on the user and/or the external system/device. The AI model trainer 184 is configured for determining a hash value for the pre-processed training dataset, and generating a digital signature from the hash value of the pre-processed training dataset using an encryption key. The AI model trainer 184 is configured to verify the pre-processed training dataset using the generated digital signature, in order to check the integrity of the obtained training dataset in at least one portion of the host operating system of the electronic device 100. Further, the AI model trainer 184 is configured to decrypt the encrypted base AI model by providing a decryption key 184*b* to a protected kernel virtual machine (PKVM). The decrypted model is re-trained using the training dataset to obtain a trained AI model.

The AI model controller 180 is implemented by processing circuitry, such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports, such as printed circuit boards and the like.

At least one of the plurality of modules/components of the AI model controller 180 may be implemented through the AI model. A function associated with the AI model may be performed through the memory 120 and the processor 140. The one or a plurality of processors 140 controls the processing of the input data in accordance with a predefined operating rule or the AI model stored in the non-volatile memory and the volatile memory. The predefined operating rule or artificial intelligence model is provided through training or learning.

Here, being provided through learning means that, by applying a learning process to a plurality of learning data, a predefined operating rule or AI model of a desired characteristic is made. The learning may be performed in a device itself in which AI according to an embodiment is performed, and/or may be implemented through a separate server/system.

The AI model may consist of a plurality of neural network layers. Each layer has a plurality of weight values and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning process is a method for training a predetermined target device (for example, a robot) using a plurality of learning data to cause, allow, or control the target device to make a determination or prediction. Examples of learning processes include, but are not limited to, supervised learning, unsupervised learning, semi-supervised learning, or reinforcement learning.

Although the FIG. 1 show the hardware elements of the electronic device 100 but it is to be understood that other embodiments are not limited thereon. In other embodiments of the disclosure, the electronic device 100 may include less or more number of elements. Further, the labels or names of the elements are used only for illustrative purpose and does not limit the scope of the disclosure. One or more components can be combined together to perform same or substantially similar function.

Figure 2:
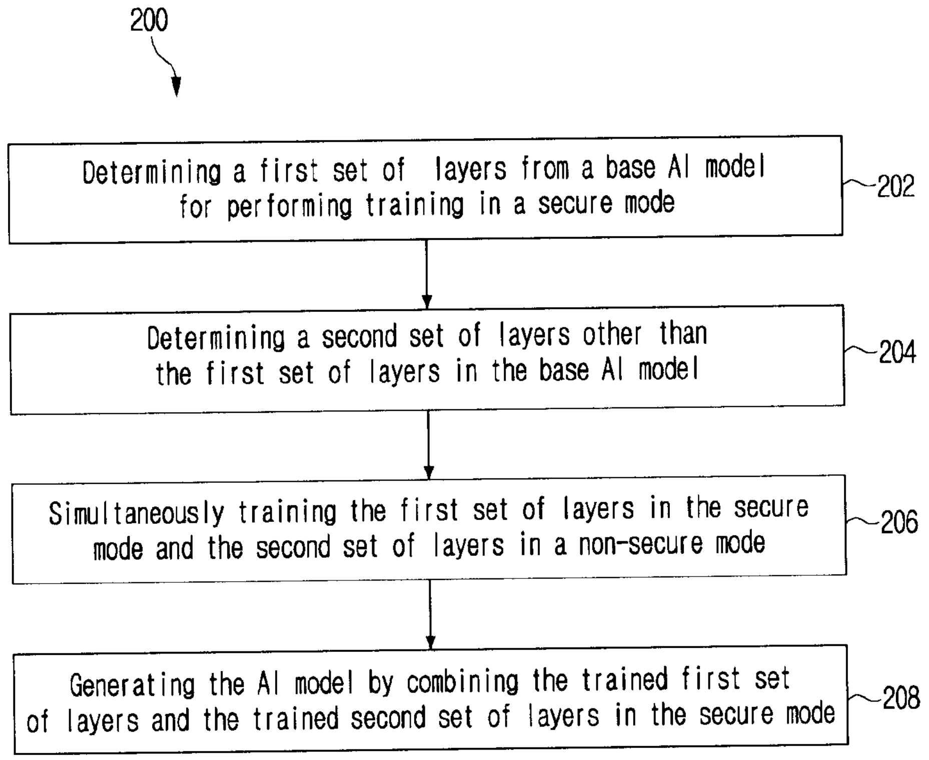
FIG. 2 is a flow chart illustrating a method for secure training of an AI model on the electronic device according to an embodiment of the disclosure.

FIG. 2 is a flowchart 200 illustrating a method for secure training of the AI model using the electronic device 100 according to an embodiment of the disclosure.

Referring to FIG. 2, at operation 202, the method includes the electronic device 100 determining the first set of layers from the base AI model for training the AI model in the secure mode. For example, in the electronic device 100 as illustrated in the FIG. 1, the AI model controller 180 is configured to determine the first set of layers from the base AI model for training the AI model in the secure mode.

The first set of layers is determined from the base AI model, by receiving the base AI model comprising a plurality of layers, determining an importance score for each layer of the plurality of layers in the base AI model based on an amount of data in each layer of the plurality of layers, determining at least one layer of the plurality of layers comprising the importance score greater than an importance score threshold, and determining the first set of layers of the plurality of layers having the importance score greater than the importance score threshold.

At operation 204, the method includes the electronic device 100 determining the second set of layers other than the first set of layers in the base AI model. For example, in the electronic device 100 as illustrated in the FIG. 1, the AI model controller 180 is configured to determine the second set of layers other than the first set of layers in the base AI model.

At operation 206, the method includes the electronic device 100 training the first set of layers in the secure mode, and the second set of layers in a non-secure mode, simultaneously. For example, in the electronic device 100 as illustrated in the FIG. 1, the AI model controller 180 is configured to train the first set of layers in the secure mode, and the second set of layers in the non-secure mode, simultaneously.

The first set of layers is trained in the secure mode, by selecting the first set of layers from the base AI model. The base AI model is encrypted using an encryption key after selecting the first set of layers from the base AI model. The training dataset is obtained from at least one application operating at a first portion of the electronic device 100. The training dataset at the first portion of the electronic device 100 is verified. The verified dataset and the encrypted base AI model with the first set of layers are sent to a second portion of the electronic device 100 for training the first set of layers in the secure mode. The first portion of the electronic device 100 is a host operating system of the electronic device 100 and the second portion is a protected kernel virtual machine (PKVM) of the electronic device 100.

The training dataset at the first portion of the electronic device 100 is verified by pre-processing the training dataset, determining the hash value of the pre-processed training dataset, generating a digital signature from the hash value of the pre-processed training dataset using the encryption key, and verifying the pre-processed training dataset based on the generated digital signature.

The second set of layers is trained in the non-secure mode by selecting the second set of layers from the base AI model, and sending the base AI model with the second set of layers to the first portion of the electronic device 100 for training the second set of layers in the non-secure mode.

The first set of layers and the second set of layers are trained simultaneously, by selecting a first type of training from a plurality of layer training types to train the first set of layers, selecting a second type of training from a plurality of layer training types to train the second set of layers, and simultaneously training the first set of layers in the secure mode using the first type of training and the second set of layers in the non-secure mode using the second type of training. The first type of training is different than the second type of training. Alternatively, the first set of layers and the second set of layers are trained simultaneously by selecting one type of training from the plurality of layer training types to train the first set of layers and the second set of layers, and simultaneously training the first set of layers in the secure mode using the selected type of training and the second set of layers in the non-secure mode using the same selected type of training.

The plurality of layer training types includes but not limited to a regular training type, a transfer learning training type, a continual learning training type, a few shot learning training type, a reinforcement learning training type and a shallow learning training type.

At operation 208, the method includes the electronic device 100 generating a securely trained model by combining the trained first set of layers and the trained second set of layers in the secure mode. For example, in the electronic device 100 as illustrated in the FIG. 1, the AI model controller 180 is configured to generate a securely trained model by combining the trained first set of layers and the trained second set of layers in the secure mode.

The securely trained AI model is encrypted and transmitted to at least one application of the electronic device 100 for performing at least one inference action in the at least one application. The at least one application of the electronic device 100 include but not limited to a business entity application. The business entity application can be any application used for generating the securely trained AI model on-device.

The various actions, acts, blocks, steps, or the like in the method may be performed in the order presented, in a different order or simultaneously. Further, in some embodiments of the disclosure, some of the actions, acts, blocks, steps, or the like may be omitted, added, modified, skipped, or the like without departing from the scope of the disclosure.

Figure 3:
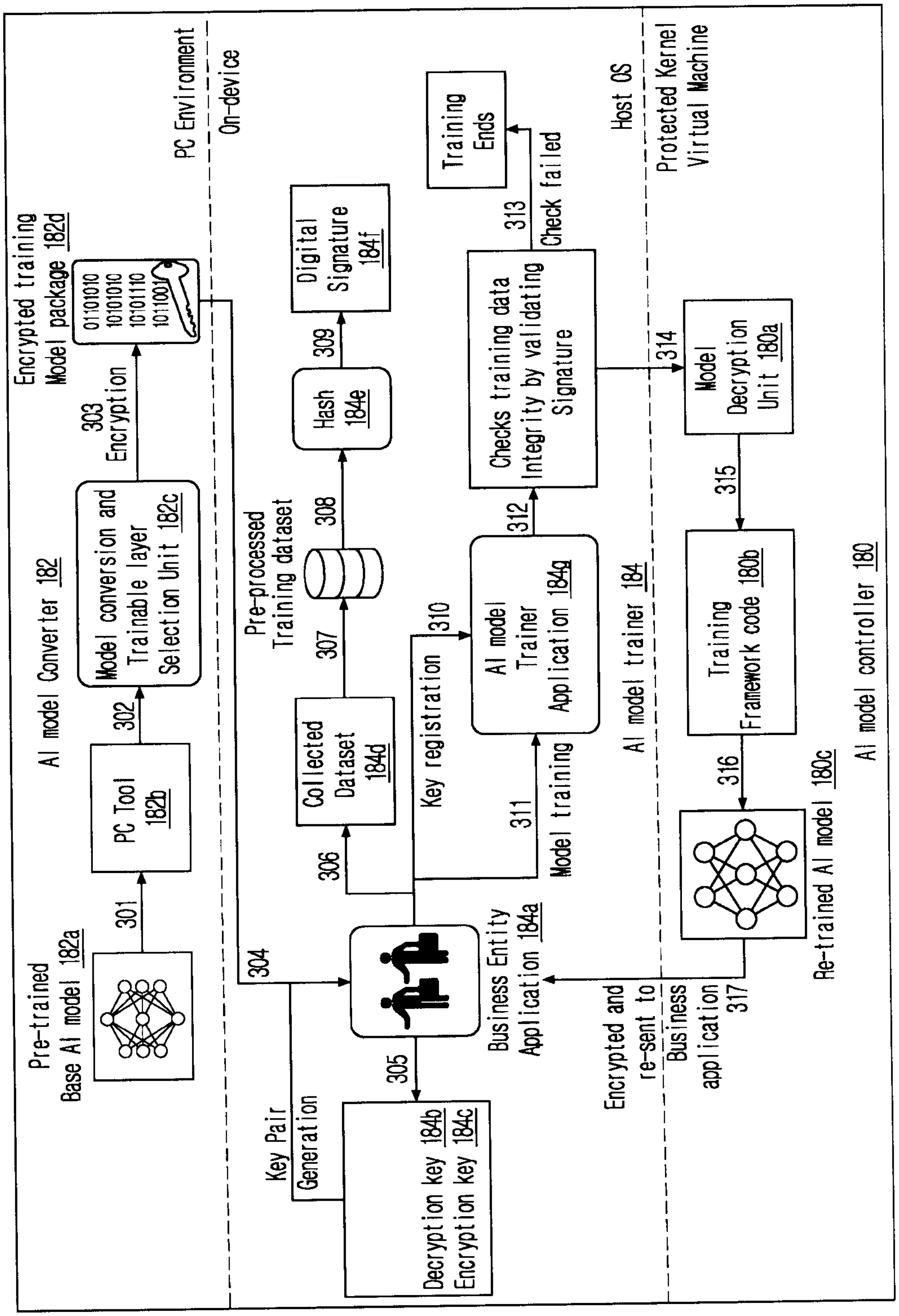
FIG. 3 is a block diagram of an AI model controller of an electronic device according to an embodiment of the disclosure.

FIG. 3 is a block diagram of the AI model controller 180 of the electronic device 100, according to an embodiment of the disclosure.

Referring to FIG. 3, at operation 301, a pre-trained base AI model 182*a* in any of the commonly used AI Framework formats is input into a PC Tool 182*b* of the AI model controller 180.

At operation 302, the converted base AI model is provided to a model conversion and trainable layer selection unit 182*c*. The model conversion and trainable layer selection unit 182*c* is configured for converting the commonly used AI Framework formats to the device trainable format. The model conversion and trainable layer selection unit 182*c* is configured to determine the first set of layers from the base AI model for training the AI model in the secure mode, and the second set of layers other than the first set of layers in the base AI model for training in the non-secure mode. The first set of layers is determined from the base AI model in the non-secure mode, by receiving the base model comprising a plurality of layers, determining an importance score for each layer of the plurality of layers based on an amount of data available in each layer of the plurality of layers, determining at least one layer of the plurality of layers having the importance score greater than an importance score threshold, and determining the first set of layers of the plurality of layers having the importance score greater than the importance score threshold. The plurality of layers in the base AI model include but not limited to fully connected layers, convolution layers, neural network layers, rectified linear unit (Relu) activation layers, long short-term memory (LSTM) layers, or the like.

At operation 303, the converted base AI model is encrypted after selecting the first set of layers and the second set of layers from the base AI model 182*a*. The encrypted base AI model is stored as an encrypted training model package 182*d* with necessary information.

At operation 304, the encrypted training model package 182*d* is shared to the business entity application 184*a*. The business entity application 184*a* can be any application used for generating the securely trained AI model on-device. The business entity application 184*a* includes the encrypted training model package 182*d* in an android package kit (APK).

At operation 305, the business entity application 184*a* performs key pair generation and generates a decryption key 184*b* and an encryption key 184*c*, simultaneously.

At operation 306, the business entity application 184*a* obtains the training dataset 184*d* from the user and/or external system/device. The business entity application 184*a* is capable of generating the training dataset. The business entity application 184*a* is configured to perform on-device pre-training of the base AI model 182*a* by obtaining the training dataset 184*d*.

At operation 307, the business entity application 184*a* is configured to perform on-device pre-processing of the obtained training dataset 184*d*. The pre-processed training dataset is verified to check the integrity of the training dataset 184*d* in at least one portion of the host operating system of the electronic device 100.

At operation 308, the business entity application 184*a* is configured to determine a hash value 184*e* for the pre-processed training dataset. At operation 309, the business entity application 184*a* is configured to generate a digital signature 184*f* from the determined hash value 184*e* of the pre-processed training dataset using the encryption key 184*c*. The generated digital signature 184*f* and the pre-processed training dataset are stored for training the base AI model 182*a*.

At operation 310, the business entity application 184*a* is configured to register the decryption key 184*b* and the encryption key 184*c* in an AI model trainer application 184*g*.

At operation 311, the business entity application 184*a* sends a request to the AI model trainer application 184*g* to perform on-device training of the base AI model 182*a* including the encrypted training model package 182*d*, the pre-processed training dataset, the decryption key 184*b* of the business entity application 184*a*, the hash value 184*e* of the pre-processed training dataset, and the digital signature 184*f*.

At operation 312, on receiving the request, the AI model trainer application 184*g* checks the integrity of the training dataset by validating the digital signature 184*f*. At operation 313, the training of the base AI model 182*a* ends when the integrity of the training dataset is non-authentic.

At operation 314, the encrypted training model package 182*d* is sent to a model decryption unit 180*a*. The model decryption unit 180*a* is configured to decrypt the encrypted training model package 182*d* in PKVM. The encrypted training model package 182*d* is decrypted by providing the decryption key 184*b* to the PKVM.

At operation 315, the decrypted training model package is trained using the training dataset 184*d*. At operation 316, a training framework code 180*b* is transmitted to train the decrypted training model package.

At operation 317, the re-trained AI model 180*c* is encrypted and transmitted to the business entity application 184*a* for performing at least one inference action in the at least one application using the encrypted AI model.

Figure 4:
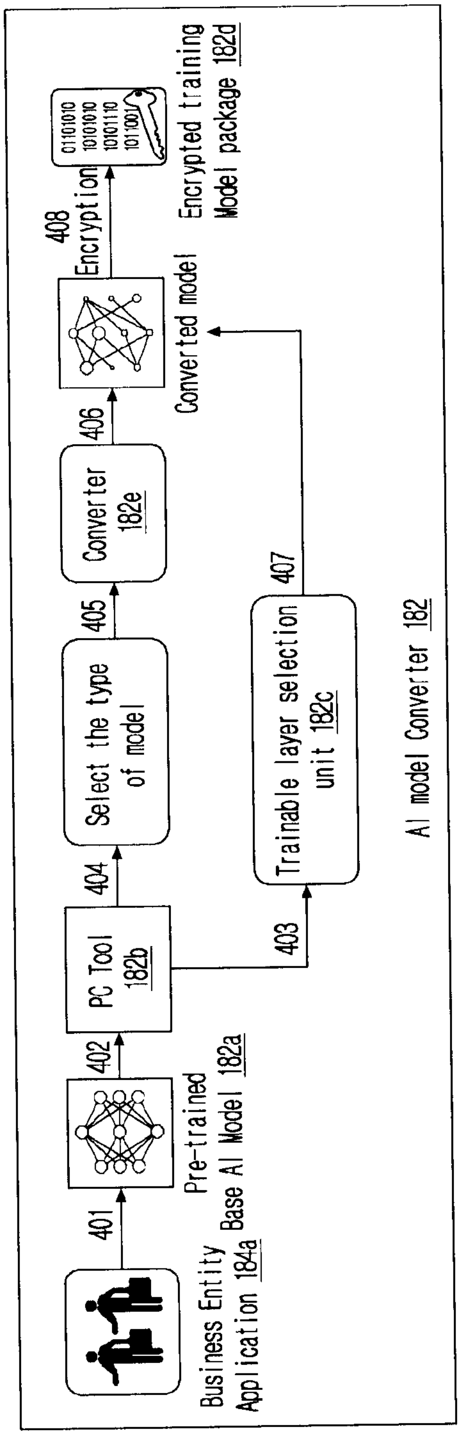
FIG. 4 is a block diagram of an AI model converter of an AI model controller according to an embodiment of the disclosure.

FIG. 4 is a block diagram of the AI model converter 182 of the AI model controller 180 according to an embodiment of the disclosure.

Referring to FIG. 4, at operation 401, the business entity application 184*a* sends the base AI model 182*a* in any of the commonly used AI formats. At operation 401, a pre-trained base AI model 182*a* of any of the commonly used AI formats is sent to the PC Tool 182*b*. At operation 402, the PC Tool 182*b* provides an interface for the business entity application 184*a* to determine the layers of the pre-trained base AI model 182*a* to be trained for training the pre-trained base AI model 182*a*. At operation 403, the layers of the pre-trained base AI model 182*a* to be trained are determined by receiving the base AI model 182*a* comprising a plurality of layers, determining the importance score for each layer of the plurality of layers in the base AI model 182*a* based on the amount of data in each layer of the plurality of layers, determining at least one layer of the plurality of layers comprising the importance score greater than an importance score threshold, and determining the first set of layers of the plurality of layers having the importance score greater than the importance score threshold. The number of layers can be selected based on the size and requirements of the business entity application 184*a*.

At operation 404, the PC Tool 182*b* selects the type or format of the base AI model 182*a*. The format of the base AI model 182*a* includes but not limited to TensorFlow Lite (tflite), Keras, PyTorch, CoreAI, Scikit, TensorFlow, or the like. At operation 405, the base AI model 182*a* of any of the commonly used AI formats is sent to a converter 182*e*. The converter 182) is configured to convert the base AI model 182*a* of any format to the device compatible trainable format, along with the interface. At operation 406 and 407, once the conversion is complete, the PC tool 182*b* packages the converted model, trainable layer information and other useful parameters into a single package. At operation 408, the PC tool 182*b* encrypts the single package and obtains the encrypted training model package 182*d*.

Figure 5:
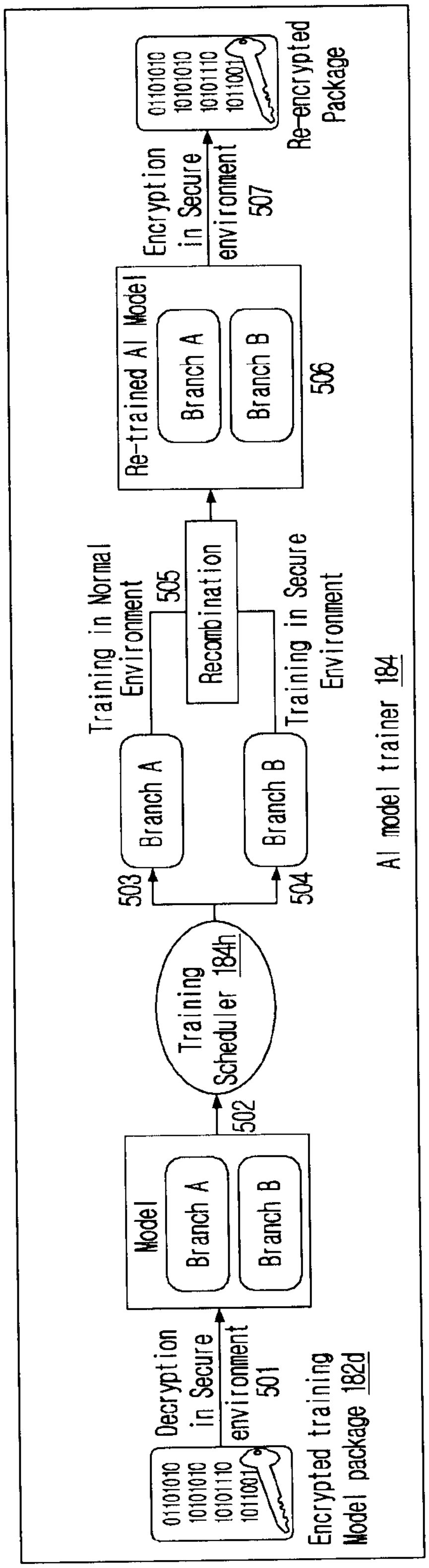
FIG. 5 is a block diagram of an AI model trainer of an AI model controller according to an embodiment of the disclosure.

FIG. 5 is a block diagram of the AI model trainer 184 of the AI model controller 180 according to an embodiment of the disclosure.

Referring to FIG. 5, at operation 501, the encrypted training model package 182*d* is decrypted in the secure mode to split the model package 182*d*. At operation 502, the decrypted model package includes nodes with multiple output edges. The branches, namely a Branch A and a Branch B beginning with the output edges are processed simultaneously. In case if such nodes are absent in the decrypted model package, the important nodes with most information, such as for example but not limited to convolution layer, fully connected layer, and LSTM layer, or the like, are selected and placed on separate processors. At operation 503 and 504, a training scheduler 184*h* is configured to split the branches, namely the Branch A and the Branch B of the decrypted model package separately, to train the Branch A and the Branch B of the decrypted model package simultaneously. The training scheduler 184*h* ensures that there is minimal latency while forward passing the input and backward propagating the losses generated during training of the base AI model 182*a*.

At operation 505, the Branch A of the decrypted model package is trained in the non-secure mode, and the Branch B of the decrypted model package is trained in the secure mode, simultaneously. The trained Branch A and Branch B are recombined in secure mode. At operation 506, a re-trained model including trained Branch A and Branch B is generated. At operation 507, the re-trained model is encrypted in secure mode to generate a re-encrypted package. The encrypted package is shared back to the business entity application 184*a* for performing inference of the AI Model.

Figure 6:
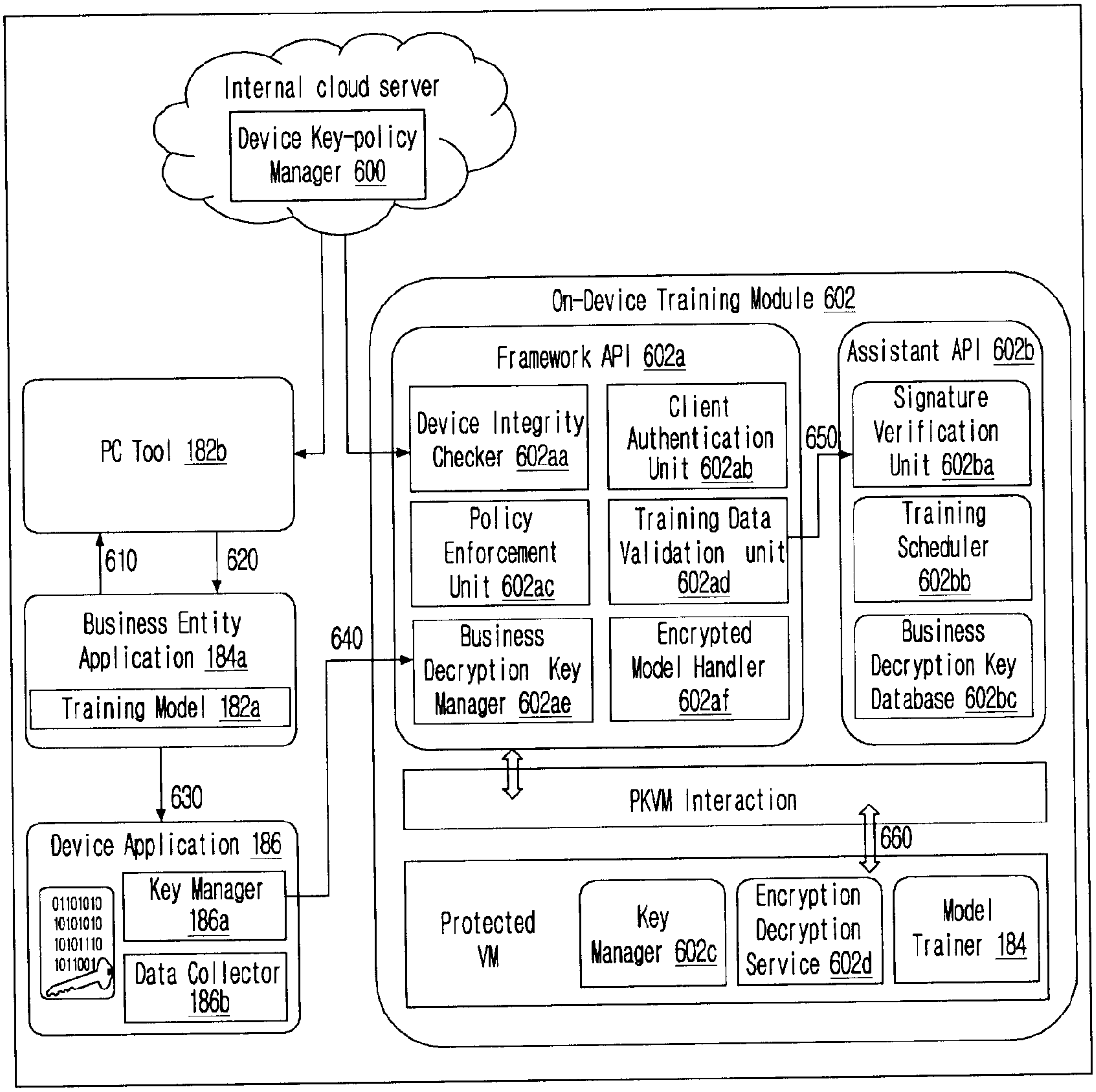
FIG. 6 is a block diagram illustrating a process of secure training of an AI model on the electronic device according to an embodiment of the disclosure.

FIG. 6 is a block diagram illustrating the process of secure training of the AI model by the electronic device 100 according to an embodiment of the disclosure.

Referring to FIG. 6, a device key-policy manager 600 is configured to manage the key pair generation and on-device training of AI model on the electronic device 100. At operation 610, the business entity application 184*a* is configured to send the base AI model 182*a* of any commonly used format to the PC Tool 182*b*. The PC Tool 182*b* converts the base AI model 182*a* of any commonly used format to the on-device trainable format, and selects the trainable layers of the training model 182*a* based on the amount of data contained in the layers of the base AI model 182*a*, regarding the AI model. The PC Tool 182*b* encrypts the converted model and stores as the encrypted training model package 182*d* with necessary information. At operation 620, the PC Tool 182*b* sends the encrypted training model package 182*d* to the APK of the business entity application 184*a*.

At operation 630, the encrypted training model package 182*d* is stored in one of an application 186 of the electronic device 100. A key manager 186*a* of the device application 186 is configured to manage the generation of the decryption key 184*b* and the encryption key 184*c* by the business entity application 184*a*. A data collector 186*b* of the device application 186 is configured to obtain the training dataset from the user and/or external system/device, or the device application 186 itself generates the training dataset in the electronic device 100 without depending on the user and/or the external system/device.

At operation 640, the determined data is provided to an on-device training module 602. The on-device training module 602 includes a framework application programming interface (API) 602*a* and an assistant API 602*b*. The on-device training module (602 performs training of the encrypted training model package 182*d* on-device.

A device integrity checker 602*aa* of the framework API 602*a* is configured to check the device integrity using the training dataset determined from the device application 186. The integrity of the electronic device 100 is checked to ensure that the device 100 is not in a compromised state. A client authentication unit 602*ab* is configured to check whether the client is an authentic client or a non-authentic client, in response to the data obtained by the data collector 186*b*. A policy enforcement unit 602*ac* is configured to manage the network and connectivity between the business entity application 184*a* and the device application 186. A training dataset validation unit 602*ad* is configured to pre-process the training dataset 184*d*, determine the hash value 184*e* for the pre-processed training dataset, generate the digital signature 184*f* from the determined hash value 184*e* of the pre-processed training dataset, and validate the pre-processed training dataset using the digital signature 184*f*. A business decryption key manager 602*ae* is configured to manage the decryption key 184*b* registered with the training process by the business entity application 184*a*. An encrypted model handler 602*af* is configured to manage the encrypted training model package 182*d* encrypted by the PC Tool 182*b*.

At operation 650, a signature verification unit 602*ba* of the assistant API 602*b* is configured to obtain and verify the digital signature generated in response to the determined training dataset, and ensure that the data is untampered since the business entity application 184*a* is signed. A training scheduler 602*bb* is configured to train the trainable layers of the base AI model 182*a* selected by the PC tool 182*b*, simultaneously, with respect to the verified digital signature. A business decryption key database 602*bc* stores the decryption key 184*b* registered with the training process for decrypting the encrypted training model package 182*d*.

At operation 660, PKVM communicates with the on-device training module 602 for decrypting the keys 184*b*, 184*c* for model decryption in PKVM. A key manager 602*c* manages the decryption of the keys 184*b*,184*c* used for model decryption in PKVM. The encrypted training model package 182*d* is decrypted in the PKVM. The model trainer 184 is configured for re-training the decrypted training model package using the training dataset. The decrypted and re-trained model is encrypted and shared back to the business entity application 184*a* using the encryption decryption service 602*d* in the PKVM.

Figure 7:
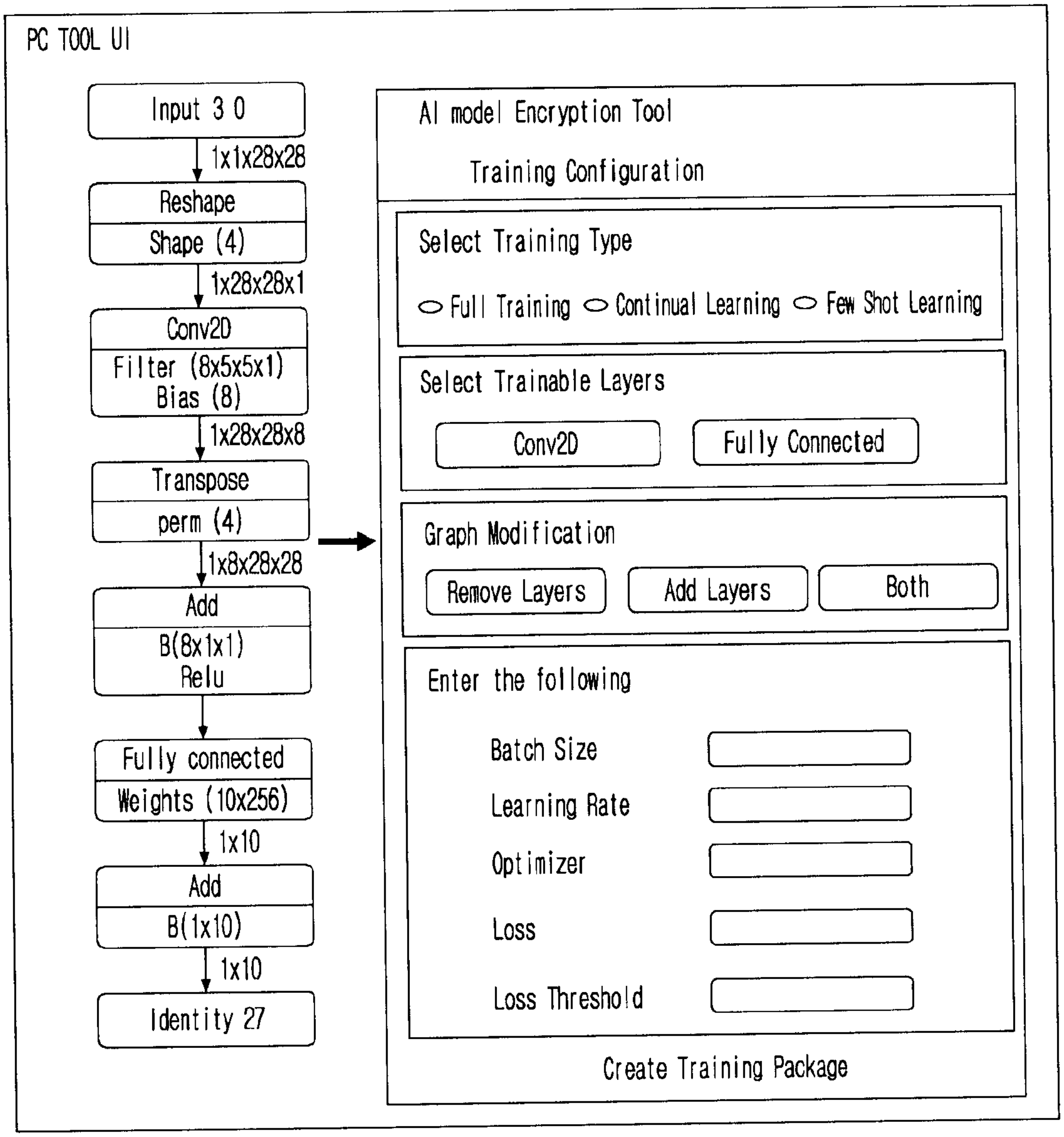
FIG. 7 is a schematic view illustrating a graph and a user interface (UI) of a PC tool for creating a training package according to an embodiment of the disclosure.

FIG. 7 is a schematic view illustrating a graph and a user interface (UI) of the PC tool 182*b* for creating the training package according to an embodiment of the disclosure.

Referring to FIG. 7, the process for creating the model training package is illustrated with the graph and the UI of the PC tool 182*b*. The PC tool UI includes an AI model encryption tool for selecting and configuring the layers to be trained to work in constrained devices. The layers to be trained can be selected and configured by selecting the layer training type. The layer training type includes but not limited to the regular training type, the transfer learning training type, the continual learning training type, the few shot learning training type, the reinforcement learning training type and the shallow learning training type. The trainable layers of the AI model are selected based on the most information contained in the layers of the AI model, regarding the AI model. The trainable layers of the AI model include but not limited to fully connected layers, convolution layers, neural network layers, rectified linear unit (Relu) activation layers, long short-term memory (LSTM) layers, or the like. The trainable layers of the AI model can be added or removed based on the requirements of the users by modifying the graph. The trainable layers of the AI model are selected, determined and trained for training the AI model. The AI model is encrypted to create a training package by inputting the configuration parameters, after training the trainable layers of the AI model, simultaneously. The configuration parameters include but not limited to a batch size of the AI model, a learning rate of the AI model, an optimizer of the AI model, and a loss threshold of the AI model. The training package is created based on the requirements of the users.

Figure 8A:
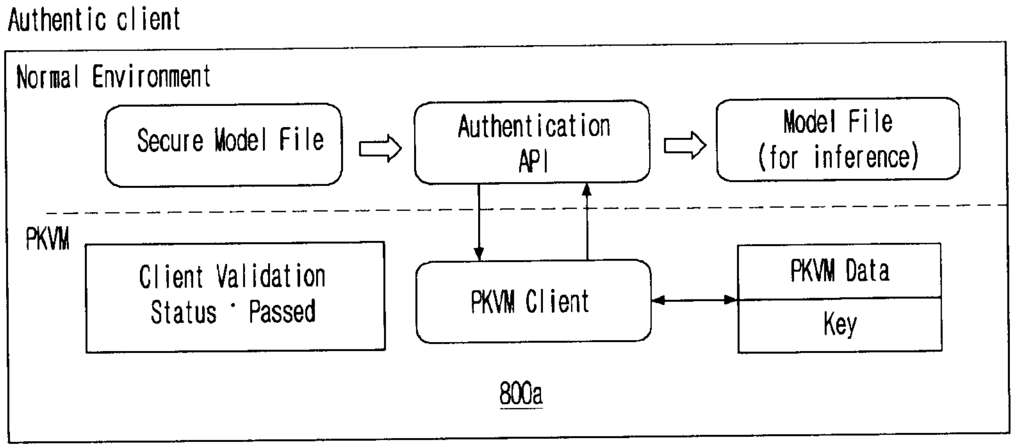
FIGS. 8A and 8B are block diagrams illustrating a process for secure validation of clients using digital signatures according to various embodiments of the disclosure.
Figure 8B:
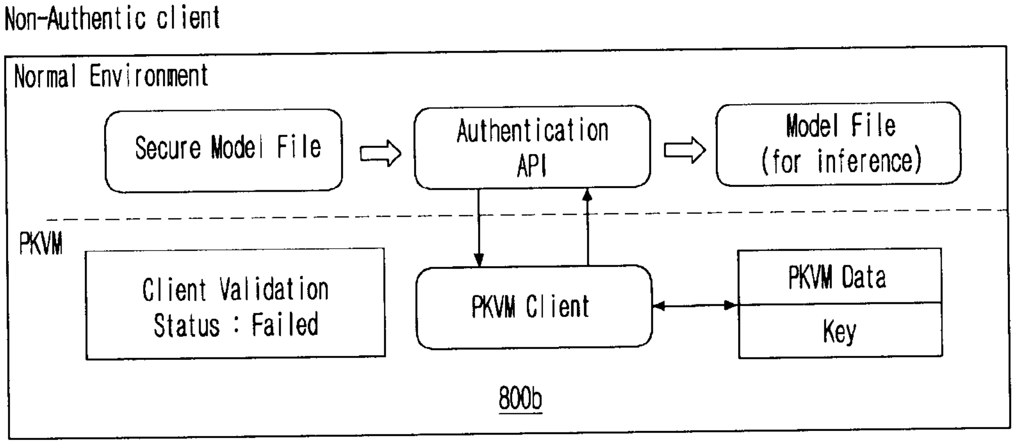

FIGS. 8A and 8B are block diagrams 800*a* and 800*b* illustrating the process for secure validation of clients using digital signatures according to various embodiments of the disclosure.

Referring to FIGS. 8A and 8B, the device integrity checker 602*aa* of the framework API 602*a* in the on-device training module 602 is configured to check the device integrity using the training dataset determined from the device application 186. The integrity of the electronic device 100 is checked to ensure that the device 100 is not in a compromised state. The client authentication unit 602*ab* of the framework API 602*a* is configured to check whether the client is authentic or non-authentic client, in response to the data determined by the data collector 186*b*. The determined training dataset is verified for secure validation of clients, by pre-processing the determined data, calculating the hash value for the pre-processed data, and generating the digital signature from the determined hash value of the pre-processed data. Therefore, secure validation of clients using the digital signature ensures controlled access of the AI model, and blacklisting of clients during validation failure ensures protection of the AI model against malicious operations.

Figure 8C:
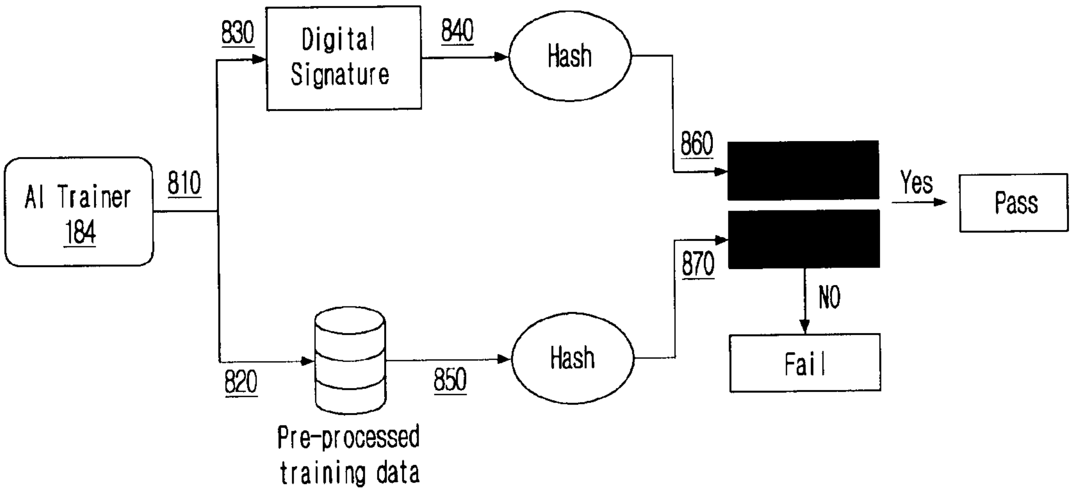
FIG. 8C is a block diagram illustrating a process for verifying a training dataset source using digital signatures according to an embodiment of the disclosure.

FIG. 8C is a block diagram illustrating the process for verifying a training dataset source using digital signatures according to an embodiment of the disclosure.

Referring to FIG. 8C, at operation 810, the AI model trainer 184 is configured for training the AI model securely. The AI model trainer 184 obtains the training dataset 184*d* from the device application 186 and verifies the obtained training dataset 184*d*. The device application 186 obtains the training dataset 184*d* from the user and/or the external system/device, or the device application 186 itself generates the training dataset without depending on the on the user and/or the external system/device. At operation 820, the AI model trainer 184 pre-processes the obtained training dataset 184*d* from the device application 186. At operation 830, the AI model trainer 184 determines the hash value 184*e* for the pre-processed training dataset, and generates digital signatures 184*f* from the determined hash value 184*e* of the pre-processed training dataset. At operations 840 and 850, the AI model trainer 184 checks the integrity of the training dataset 184*d* using the hash value 184*e* and the digital signatures 184*f* generated from the hash value 184*e* of the pre-processed training dataset. At operations 860 and 870, secure validation of clients is made to check if the client is authentic or non-authentic for training the AI model in secure mode based on the requirements of clients. If the client is authentic, the AI model is trained in secure mode. The training process ends, if the client is non-authentic.

FIG. 9 is a block diagram illustrating a run-time execution of AI model in the PKVM according to an embodiment of the disclosure.

Referring to FIG. 9, the run-time execution of AI model is performed using the host operating system 910 and the protected virtual machine 920. Initially, the clients interact with the host operating system 910 and provide the training dataset 184*d* for training the AI model to a software development kit (SDK) in normal mode. The host operating system 910 can be accessed by N number of clients. The operating system used in the host operating system 910 is for example but not limited to an Android system. Generic kernel image (GKI) in Android presents a stable kernel module interface (KMI) for a vendor virtual machine, so that the PKVM can be updated independently. The training dataset 184*d* is then sent to the protected virtual machine 920. The access to the protected virtual machine 920 is restricted and moderated by the host operating system 910. The operating system used in the protected virtual machine 920 is for example but not limited to MICRODROID system. A protected virtual machine firmware in the protected virtual machine 920 is configured to ensure security and protect the AI model from thefts before, after and during training of the AI model. The PKVM acts as a portable operating system interface between the host operating system 910, the protected virtual machine 920 and the processing units which include but not limited to a central processing unit (CPU), a neural processing unit (NPU), a graphics processing unit (GPU) for training the AI model in the secure mode.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for secure training of an artificial intelligence (AI) model by an electronic device, wherein the method comprises:

determining, by the electronic device, a first set of layers from a base AI model comprising a plurality of layers for performing training in a secure mode;

determining, by the electronic device, a second set of layers other than the first set of layers in the base AI model;

simultaneously training, by the electronic device, the first set of layers in the secure mode at a secure portion of the electronic device and the second set of layers in a non-secure mode at a non-secure portion of the electronic device different from the secure portion; and generating, by the electronic device, the AI model by combining the trained first set of layers and the trained second set of layers in the secure mode at the secure portion, wherein the determining of the first set of layers comprises:

determining, by the electronic device, an importance score for each layer of the plurality of layers based on an amount of data available in each layer of the plurality of layers, and determining, by the electronic device, the first set of layers of the plurality of layers having the importance score greater than an importance score threshold.

2. The method of claim 1, wherein training, by the electronic device, the first set of layers in the secure mode comprises:

selecting, by the electronic device, the first set of layers from the base AI model;

encrypting, by the electronic device, the base AI model using an encryption key after selecting the first set of layers from the base AI model;

obtaining, by the electronic device, a training dataset from at least one application at a first portion corresponding to the non-secure portion of the electronic device;

verifying, by the electronic device, the training dataset at the first portion of the electronic device; and sending, by the electronic device, the verified dataset and the encrypted base AI model with the first set of layers to a second portion corresponding to the secure portion of the electronic device for training the first set of layers in the secure mode.

3. The method of claim 2, wherein training, by the electronic device, the second set of layers in the non-secure mode comprises:

selecting, by the electronic device, the second set of layers from the base AI model; and sending, by the electronic device, the base AI model with the second set of layers to the first portion corresponding to the non-secure portion of the electronic device for training the second set of layers in the non-secure mode.

4. The method of claim 2, wherein the first portion is a host operating system of the electronic device, and wherein the second portion is a protected kernel virtual machine (PKVM) of the electronic device.

5. The method of claim 2, wherein verifying, by the electronic device, the training dataset at the first portion of the electronic device comprises:

determining, by the electronic device, a hash value of the training dataset;

generating, by the electronic device, a digital signature from the hash value of the training dataset using the encryption key; and verifying, by the electronic device, the training dataset based on the generated digital signature.

6. The method of claim 2, wherein the method comprises training, by the electronic device, the base AI model by:

decrypting, by the electronic device, the encrypted base AI model using a decryption key at the second portion of the electronic device; and training, by the electronic device, the base AI model using the training dataset.

7. The method of claim 1, simultaneously training, by the electronic device, the first set of layers in the secure mode at the secure portion and the second set of layers in the non-secure mode at the non-secure portion comprises:

selecting, by the electronic device, at least one first type of training from a plurality of layer training types to train the first set of layers;

selecting, by the electronic device, at least one second type of training from the plurality of layer training types to train the second set of layers, wherein the at least one first type of training is different than the at least one second type of training; and simultaneously training, by the electronic device, the first set of layers in the secure mode at the secure portion using the at least one first type of training and the second set of layers in the non-secure mode at the non-secure portion using the at least one second type of training.

8. The method of claim 1, simultaneously training, by the electronic device, the first set of layers in the secure mode at the secure portion and the second set of layers in the non-secure mode at the non-secure portion comprises:

selecting, by the electronic device, one type of training from a plurality of layer training types to train the first set of layers and the second set of layers; and simultaneously training, by the electronic device, the first set of layers in the secure mode at the secure portion using the selected layer training type and the second set of layers in the non-secure mode at the non-secure portion using the same selected layer training type.

9. The method of claim 8, wherein the plurality of layer training types comprises:

a regular training type;

a transfer learning training type;

a continual learning training type;

a few shot learning training type;

a reinforcement learning training type; and a shallow learning training type.

10. The method of claim 1, further comprising:

encrypting, by the electronic device, the AI model;

transmitting, by the electronic device, the encrypted AI model to at least one application of the electronic device; and performing, by the electronic device, at least one inference action in the at least one application using the encrypted AI model.

11. An electronic device for secure training of an artificial intelligence (AI) model, wherein the electronic device comprises:

a memory;

a processor coupled to the memory;

a communicator coupled to the memory and the processor; and an AI model controller coupled to the memory, the processor and the communicator, and configured to:

determine a first set of layers from a base AI model comprising a plurality of layers for performing training in a secure mode, determine a second set of layers other than the first set of layers in the base AI model, simultaneously train the first set of layers in the secure mode at a secure portion of the electronic device and the second set of layers in a non-secure mode at a non-secure portion of the electronic device different from the secure portion, and generate the AI model by combining the trained first set of layers and the trained second set of layers in the secure mode at the secure portion, wherein determining the first set of layers comprises:

determining, by the electronic device, an importance score for each layer of the plurality of layers based on an amount of data available in each layer of the plurality of layers, and determining, by the electronic device, the first set of layers of the plurality of layers having the importance score greater than an importance score threshold.

12. The electronic device of claim 11, wherein train the first set of layers in the secure mode comprises:

select the first set of layers from the base AI model;

encrypt the base AI model using an encryption key after selecting the first set of layers from the base AI model;

obtain a training dataset from at least one application at a first portion corresponding to the non-secure portion of the electronic device;

verify the training dataset at the first portion of the electronic device; and send the verified dataset and the encrypted base AI model with the first set of layers to a second portion corresponding to the secure portion of the electronic device for training the first set of layers in the secure mode.

13. The electronic device of claim 12, wherein train the second set of layers in the non-secure mode comprises:

select the second set of layers from the base AI model; and send the base AI model with the second set of layers to the first portion corresponding to the non-secure portion of the electronic device for training the second set of layers in the non-secure mode.

14. The electronic device of claim 12, wherein the first portion is a host operating system of the electronic device, and wherein the second portion is a protected kernel virtual machine (PKVM) of the electronic device.

15. The electronic device of claim 12, wherein verify the training dataset at the first portion of the electronic device comprises:

determine a hash value of the training dataset;

generate a digital signature from the hash value of the training dataset using the encryption key; and verify the training dataset based on the generated digital signature.

16. The electronic device of claim 12, wherein the electronic device trains the base AI model by:

decrypting the encrypted base AI model using a decryption key at the second portion of the electronic device; and training the base AI model using the training dataset.

17. The electronic device of claim 11, simultaneously train the first set of layers in the secure mode at the secure portion and the second set of layers in the non-secure mode at the non-secure portion comprises:

select at least one first type of training from a plurality of layer training types to train the first set of layers;

select at least one second type of training from the plurality of layer training types to train the second set of layers, wherein the at least one first type of training is different than the at least one second type of training; and simultaneously train the first set of layers in the secure mode at the secure portion using the at least one first type of training and the second set of layers in the non-secure mode at the non-secure portion using the at least one second type of training.

18. The electronic device of claim 11, simultaneously train the first set of layers in the secure mode at the secure portion and the second set of layers in the non-secure mode at the non-secure portion comprises:

select one type of training from a plurality of layer training types to train the first set of layers and the second set of layers; and simultaneously train the first set of layers in the secure mode at the secure portion using the selected type of training and the second set of layers in the non-secure mode at the non-secure portion using the same selected type of training.

* * * * *